United States Patent [19]

Fasching et al.

[11] 4,350,040
[45] Sep. 21, 1982

[54] CAPACITANCE-LEVEL/DENSITY MONITOR FOR FLUIDIZED-BED COMBUSTOR

[75] Inventors: George E. Fasching; Carroll E. Utt, both of Morgantown, W. Va.

[73] Assignee: The United States of America as represented by the United States Department of Energy, Washington, D.C.

[21] Appl. No.: 163,368

[22] Filed: Jun. 26, 1980

[51] Int. Cl.³ .................... G01F 23/26; G01R 27/26
[52] U.S. Cl. .................................. 73/304 C; 324/61 P
[58] Field of Search ................ 73/304 C; 324/61 P

[56] References Cited

U.S. PATENT DOCUMENTS

| | | | |
|---|---|---|---|
| 2,962,641 | 11/1960 | Maltby et al. | 324/61 R X |
| 3,010,320 | 11/1961 | Sollecito | 73/304 C |
| 3,301,056 | 1/1967 | Blanchard et al. | 73/304 C |
| 3,879,644 | 4/1975 | Maltby | 324/61 P X |
| 4,003,259 | 1/1977 | Hope | 73/304 C |
| 4,177,421 | 12/1979 | Thornburg | 324/61 R |
| 4,190,797 | 2/1980 | Lecklider et al. | 324/61 R |
| 4,209,740 | 6/1980 | Morthe et al. | 324/61 P X |
| 4,222,267 | 9/1980 | Aldrich | 73/304 C |

*Primary Examiner*—Daniel M. Yasich
*Attorney, Agent, or Firm*—David E. Breeden; Stephen D. Hamel; Richard G. Besha

[57] ABSTRACT

A multiple segment three-terminal type capacitance probe with segment selection, capacitance detection and compensation circuitry and read-out control for level/density measurements in a fluidized-bed vessel is provided. The probe is driven at a high excitation frequency of up to 50 kHz to sense quadrature (capacitive) current related to probe/vessel capacitance while being relatively insensitive to the resistance current component. Compensation circuitry is provided for generating a negative current of equal magnitude to cancel out only the resistive component current. Clock-operated control circuitry separately selects the probe segments in a predetermined order for detecting and storing this capacitance measurement. The selected segment acts as a guarded electrode and is connected to the read-out circuitry while all unselected segments are connected to the probe body, which together form the probe guard electrode. The selected probe segment capacitance component signal is directed to a corresponding segment channel sample and hold circuit dedicated to that segment to store the signal derived from that segment. This provides parallel outputs for display, computer input, etc., for the detected capacitance values. The rate of segment sampling may be varied to either monitor the dynamic density profile of the bed (high sampling rate) or monitor average bed characteristics (slower sampling rate).

5 Claims, 5 Drawing Figures

CAPACITANCE-LEVEL/DENSITY MONITOR FOR FLUIDIZED-BED COMBUSTOR

BACKGROUND OF THE INVENTION

This invention relates generally to capacitance measuring devices and, more specifically to a three-terminal capacitance measuring system employing multiple and separately selectable capacitance probe segments for monitoring the level/density of a fluidized-bed.

In a fluidized-bed reactor or combustor, the bed is fluidized by means of passing gas (air) up through the bed at a high enough velocity that the bed is agitated and partially lifted or suspended, usually in a continual but intermittent manner, such that the dynamic motion of the bed of solid particles behaves somewhat like a liquid fluid. This effect provides good particle blending and velocity that enhances heat transfer to boiler tubes for power plant use, for example. The mixing action also improves the spatial uniformity of the reactor which involves usually not only the combustion of a hydrocarbon fuel (such as coal, oil shale, etc.), but also a reaction with limestone which is also fed into the bed to remove much of the sulfur released from the fuel.

Normally, fluidizing air as it moves up through the bed forms bubbles or voids that propagate up through the bed. The rate of formation and size of the bubbles can be controlled to some degree by the velocity of the gas in the bed and the hole pattern of the air distribution plate. If the velocity is too high, then an excessive amount of solids is carried out of the reactor; if too low, inadequate fluidization is provided.

Factors affecting optimum velocity are the bed level and density. A measure of these two variables is extremely important and maintain the bed holdup (mass) and fluidization quality.

The density of the upper bed boundary varies with time (during fluidization as a result of bubble action) and with bed height. The transition from high average density to low average density at that upper boundary can range up to several inches (typically 4-6 inches), depending upon many factors.

It has been the practice to determine the bed level by means of an overflow tube, by vertical pressure differential measurements within the bed or by a water-cooled temperature probe. The use of the overflow tube results in the loss of bed material and is not continuous or reliable. A false reading can be caused by solids spray into the tube from a bed level well below the overflow entrance as a result of high bed turbulence. It also requires manual operation.

Pressure differential measurements are difficult to calibrate because of the uncertainty of the bed density, which greatly influences the pressure, and the pressure taps tend to become plugged by the bed solids.

A cooled partially immersed temperature probe with temperature sensors spaced along its vertical length is used to sense a temperature gradient change along its length corresponding to the bed level. This method suffers from lack of sensitivity and of solids layer build-up upon the surface causing uncertainty in level readings. Dynamic observations are not possible.

Thus, there is a need for a means of continuous measurement of the bed level, or mass, and density within a fluidized-bed combustor.

SUMMARY OF THE INVENTION

In view of the above need, it is an object of this invention to provide a system for monitoring the density/level of any fluidized medium or a fluid.

Another object of this invention is to provide a capacitance-based monitoring system for measuring the density profile and/or level of a fluidized bed.

Further, it is an object of this invention to provide a capacitance-based density/level monitoring system for a fluidized bed which automatically detects the dynamic profile of a fluidized bed.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects in accordance with the purpose of the present invention as embodied and broadly described herein, the capacitance-based density/level monitoring device of this invention may comprise a capacitance probe adapted for vertical orientation in a fluid-like medium contained within an electrically conductive containment vessel wherein an electrically conductive probe housing forms a guard electrode and further comprises a plurality of electrically conductive segments positioned vertically of the probe housing so that each segment separately forms a guarded electrode electrically insulated from the housing. Means are provided for applying a predetermined frequency excitation voltage between the containment vessel wall and the probe housing thereby generating a current through the medium. A capacitance detection circuit means is provided for separately sensing the quadrature current component of the current flowing between the probe and the vessel corresponding to the probe-to-vessel capacitance in the presence of a resistive current component which is in phase with the excitation voltage. The detection circuit generates an output voltage corresponding to the quadrature current component sensed by a selected probe segment. A segment selection circuit means is provided which is responsive to a control signal for separately connecting each of the plurality of segments of the probe to the input of the detection circuit means. A sampling circuit means is provided having a plurality of sampling channels corresponding to the plurality of probe segments to sample the output voltage from the detection circuit means from corresponding ones of the probe segments in response to the control signal. A control circuit means is provided for generating and applying the control signal to the segment selection circuit means and the sample and hold circuit means so that the selected segment capacitance value is sampled by the corresponding channel of the sampling circuit means at a preselected sampling rate.

The rate of sampling or scanning of the probe segments may be varied. The higher rates allow monitoring of the dynamic density profile of the bed, revealing bubble activity, fluidization mode and quality, and bed upper boundary transitions. The slower rate is useful for monitoring average bed characteristics.

This monitoring circuit allows for dynamic density sampling or average characteristic density sampling of a fluidized medium, such as a fluidized-bed combustor and provides convenient parallel output signals for display, computer input, etc., corresponding to the plurality of capacitance segments of the probe.

A probe arrangement is provided which is operable at the elevated temperatures approaching 2000° F. in a fluidized-bed combustor for granular coal, for example, and employs an excitation frequency up to 500 kHz to enhance the sensing of the quadrature (capacitance) current while being relatively insensitive to the resistive current. The monitor further includes a circuit to produce a negative current of equal magnitude to cancel out only the resistive component of the probe segment signal and further employs synchronous quadrature demodulation to separately sense the capacitive component of the detected signal to enhance the capacitance measurement.

This invention may be utilized to measure density, level and permittivity of a fluid-like medium including solids, liquids, or mixtures in combustors, gasifiers, reactors, and storage vessels where only a small ratio of change exists in the permittivity of the materials themselves and the gas at the boundary interfaces of the layers or within each medium of a layered mass.

DETAILED DESCRIPTION OF THE INVENTION

Figure 1:
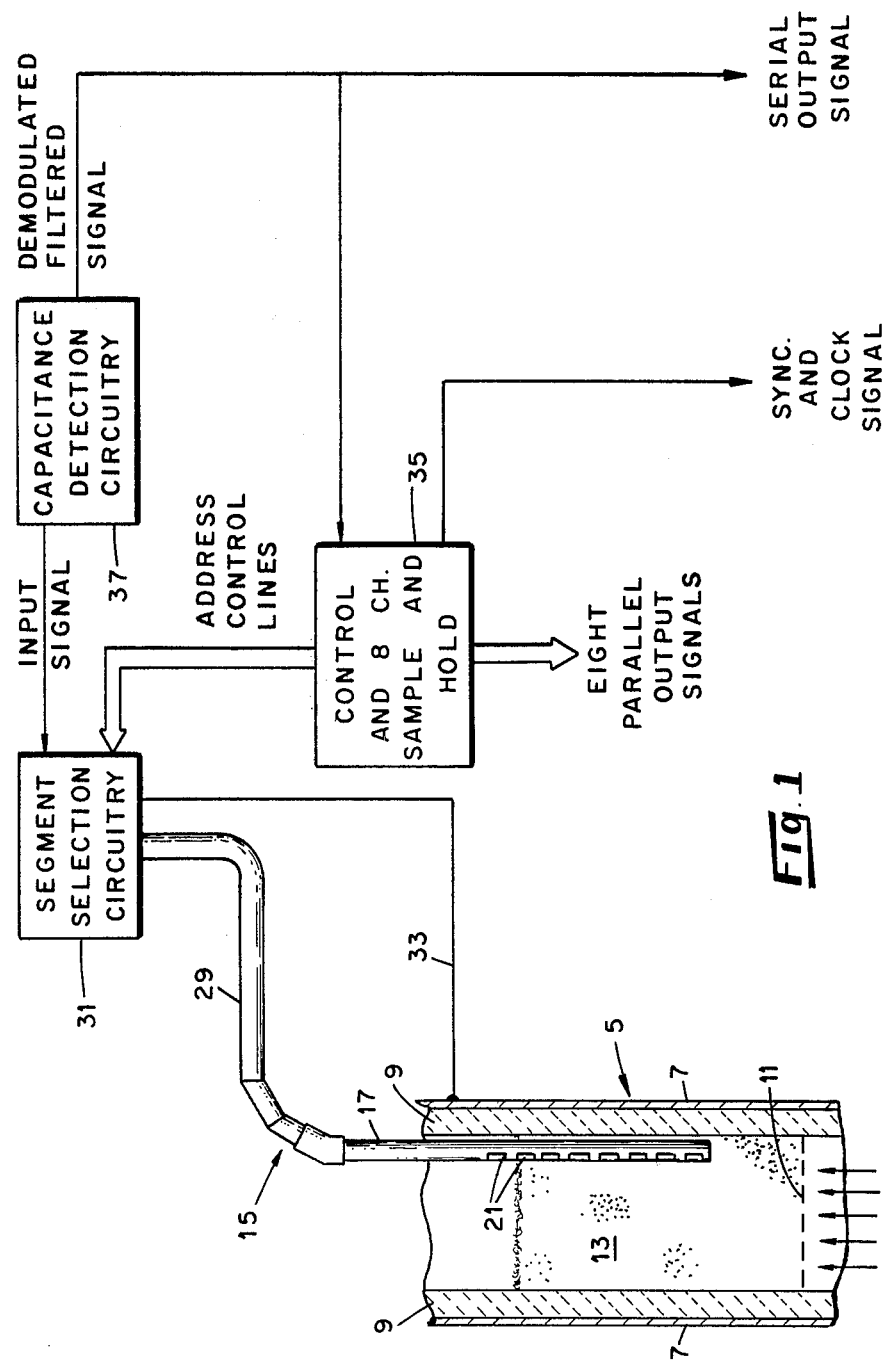
FIG. 1 is a schematic diagram of a capacitance-based density/level monitoring system in accordance with the present invention.

Referring now to FIG. 1, the invention will be described in accordance with its application to measuring the density/level of a fluidized-bed combustor for granular coal indicated in FIG. 1 by reference 5. It will be obvious to those skilled in the art from the following description of a preferred embodiment that the monitor may be used for determining the density or level of any fluid-like medium contained within an electrically conductive vessel.

The combustor 5 includes an outer vessel wall 7 which is constructed of an electrically conductive material such as stainless steel. The vessel 7 is lined with a ceramic liner 9 since the temperature of the combustor may approach 2000° F. The bed is fluidized by means of passing air up through a fine mesh screen 11 and through the bed material 13. The air is introduced at a high enough velocity that the bed is agitated and partially lifted or suspended, usually in a continual but intermittent manner, such that the dynamic motion of the bed of solid particles, such as granular coal, between somewhat like a liquid fluid.

Since the bed temperatures approach 2000° F., the resistivity of the bed drops low enough that an appreciable in-phase (resistive) component of probe current occurs. For this reason, a predetermined high frequency (up to 500 kHz) excitation voltage may be used and the detector is designed to sense the quadrature current while being relatively insensitive to the resistive current in phase with the excitation voltage. The capacitance probe 15 may take the form of a stainless steel pipe 17 approximately 1-inch diameter, disposed for vertical displacement into the bed material 13. In this example the probe is provided with 8 individual capacitance measuring segments 21 insulated from the probe body. A single segment is connected to the detector via a relay arrangement while all unselected segments are connected by relay to the probe body 17 and these with the probe body comprise a guard electrode. The selected segment acts as a single guarded electrode and the vessel wall 7 serves as an unguarded electrode, forming a three-terminal capacitance-type measuring probe.

Although the probe may be disposed in various places in the bed relative to the wall 7, it has been found that by placing the probe adjacent one wall of the vessel 5 with the aligned segments 21 facing the opposite wall of the vessel the probe is essentially a unidirectional probe responsive to the permittivity of the material between the probe segment and the opposite facing wall of the vessel.

Figure 2:
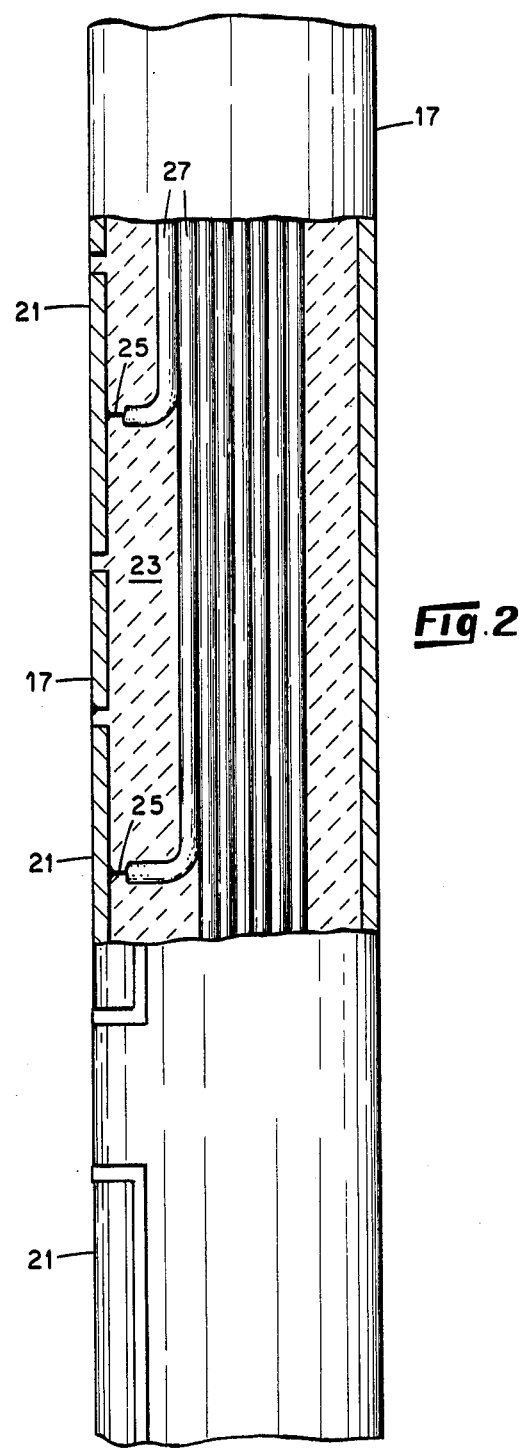
FIG. 2 is an elevational view of a partial section of the capacitance probe of FIG. 1 which has been partially cut away to show the electrical connection and orientation of the separate guarded electrode segments of the probe.

Referring now to FIG. 2, it will be seen that the probe may be formed by milling openings approximately 1-inch wide by 2-3 inches tall in the pipe 17 wall and then replacing the milled-out portion between pipe 17 and segment 21 with an electrically insulating material so that it is insulated about its entire perimeter in the wall 17. The insulator may take the form of a heat resistant ceramic insulating material 23 which may fill the entire cavity of the probe tube 17. Each capacitance segment 21 is connected to a stainless steel wire 25 which may be welded to the back side of the segment prior to its reinsertion in the insulated opening in the pipe 17. Each wire is covered by a ceramic tubing 27 which matches the high-temperature environment of the probe. The individual wires from the probe segments extend through a piping system forming a conduit 29, as shown in FIG. 1, connected to the probe 17 and to the input of a segment selection circuit 31, wherein the conduit 29 becomes one of the electrical connections from the circuitry 31 to the probe body 17. The vessel wall 7 is connected to the segment selection circuitry 31 by means of ground connection 33.

The segment selection circuitry includes relay contacts which are activated via the address control lines from a control and eight-channel sample and hold circuit 35 to connect the segments 21 in sequence one at a time to the input of a capacitance detection circuit 37. The serial output signals from the detection circuit 37 are connected by means of relays in the control and eight-channel sample and hold circuit 35 to individual sample and hold circuits dedicated to sample and store the corresponding segment detected voltage. There are eight sample and hold circuits, one for each of the eight probe segments. The parallel outputs of the sample and hold circuits provide convenient connections for displays, computer input, etc. The serial signal at the output of the detection circuit 37 may be used for strip chart recorder input (not shown).

The synchronizing and clock signals which are used to control the segment selection sequence and sampling operation may be recorded on a separate channel of the strip chart recorder simultaneous with the serial signal recording to identify the corresponding segment signals on the strip chart recording.

Figure 3:
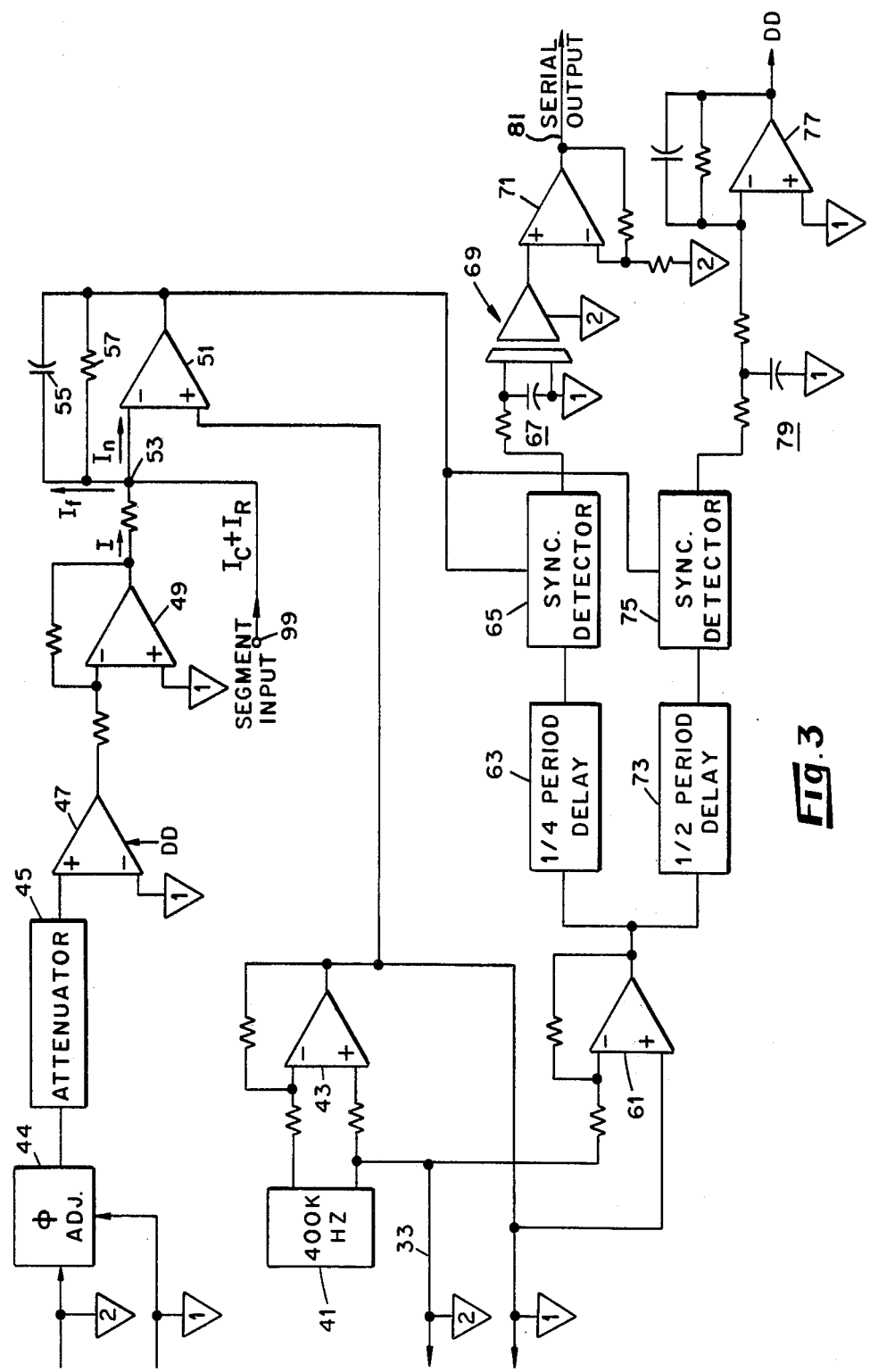
FIG. 3 is a schematic circuit diagram of the capacitance detection circuit shown in block form in FIG. 1.

The capacitance detection circuitry 37 (FIG. 1) is illustrated schematically in FIG. 3. A 400 kHz sine wave signal generator 41 provides an 8 volt peak-to-peak voltage which is connected to the input of an excitation driver amplifier 43. The amplifier 43 delivers a 20 volts peak-to-peak 400 kHz excitation voltage signal between the probe body (guard electrode) 17, as shown in FIG. 1, and the vessel wall through the connection 33. Various parts of the circuitry in the explanation which follows is referenced to either the probe housing 17 (common-1) or the vessel wall 7 (common-2). Common-2 is the combustor or reactor metal shell which serves as the unguarded electrode of the 3-terminal electrode system. The excitation voltage is also applied between the separate inputs of a variable phase adjusting circuit 44 whose output is connected to an attenuator 45.

The output of the attenuator 45 is connected to the input of a gate-controlled two-channel-input wide-band amplifier 47 that modulates the input 400 kHz excitation voltage after it has been attenuated and phase adjusted. Attenuator circuit 45 is selected to reduce the signal level at the input of amplifier 47 to prevent overload and thereby reduce nonlinear distortion in that amplifier. The gate-controlled amplifier 47 may be a commercially available amplifier, such as the Motorola type MC1445 or equivalent. The output of amplifier 47, which is kept low to minimize distortion, is amplified by means of connecting the output of amplifier 47 to the input of an amplifier 49. The gate-control voltage applied to amplifier 47 at DD is supplied from another portion of the circuit which will be explained hereinbelow. The resulting amplified signal from amplifier 49 is coupled to the summing junction of a linear summing operational amplifier 51 at its inverting input thereof. The non-inverting input of amplifier 51 is connected to the output of amplifier 43. The selected probe segment is also connected to the summing junction 53. The selected segment current consists of $I_C$ and $I_R$, the capacitive and resistive component of the current respectively. The controlled amplitude current I of amplifier 49 is generated and controlled so that it nearly cancels the resistive (in-phase) component of current $I_R$ at the summing junction. The phase of the current I may be adjusted by phase adjusting circuit 44 to provide the proper phase for canceling $I_R$ at the summing junction of amplifier 49. The resistive component of the signal is due to leakage and losses in the bed medium being sensed and the capacitive component is related to the permittivity of the bed medium being sensed. Near cancellation of the resistive component prevents overloading the amplifier 51 and subsequent circuitry including the demodulator circuit. The capacitive component of the current from the probe segment is the desired signal since it best represents a measure of bed density, which is a key indicator of the bed characteristics.

Further, amplifier 51 amplifies the resulting component at its summing junction, which as stated above is almost free of in-phase current. A feedback capacitor 55 serves as a feedback element for the 400 kHz signal while a resistor 57 in the feedback loop provides low frequency feedback to minimize amplifier drift. The capacitive component of the signal at the output of amplifier 51 is further isolated by means of synchronous detection of the separate resistive and capacitive components of the signal. Synchronous detection is accomplished by applying the 400 kHz excitation voltage to the input of an amplifier 61. The gain of amplifier 61 is set to drive the synchronous detection circuit which is connected to the output thereof.

To detect or isolate the capacitive component of the signal at the output of amplifier 51, the output of amplifier 61 is connected to the input of a $\frac{1}{4}$ period delay circuit 63. Delay 63 provides a time delay of $\frac{1}{4}$ period of the 400 kHz signal and at the end of the delay period generates a synch pulse of approximately 10 nanoseconds which is applied to the input of a synchronous detector 65. Since the capacitive component of the voltage from the output of amplifier 51 lags the excitation signal by 90°, this provides synchronous detection of this component of the signal voltage by the detector 65.

The output of detector 65 is connected through a low-pass filter 67 to the input of an isolation amplifier 69. Isolation amplifier 69 is a commercially available amplifier such as analog devices, Model No. 273K. Amplifier 69 provides a filtered density or level signal referenced to common-2 by isolating the amplifier input which is referenced to common-1. The output of amplifier 69 is connected to the input of an amplifier 71 which amplifies the signal by a gain of 2 and provides the serial output signal of the circuit as shown in FIG. 1.

The resistive component of the voltage signal from amplifier 51 which is in phase with the excitation voltage is detected by means of a delay circuit 73 and synchronous detector 75. The output of the synchronous detector 75 is coupled to the inverting input of an operational amplifier 77 through a low-pass filter circuit 79. The output of amplifier 77 provides the gate-control voltage for probe resistive component cancellation to amplifier 47 at input DD.

The $\frac{1}{2}$-period delay of delay network 73 synchronizes the drive signal to synchronous detector 75 such that any in-phase (resistive) component of the voltage from amplifier 51 output not canceled by current I is clamped at its minimum point of the sinusoidal wave. This yields a positive control voltage at amplifier 77 input. This control signal is inverted by amplifier 77 providing signal DD which is applied to the control gate of amplifier 47. Signal DD controls the gain of amplifier 47 so as to increase current I and further reduce the uncanceled in-phase voltage component at amplifier 51 output. The remainder of the signal in the output of amplifier 51 which is due to the resistive component current is removed from the serial output signal by synchronous detection as explained above.

Figure 4:
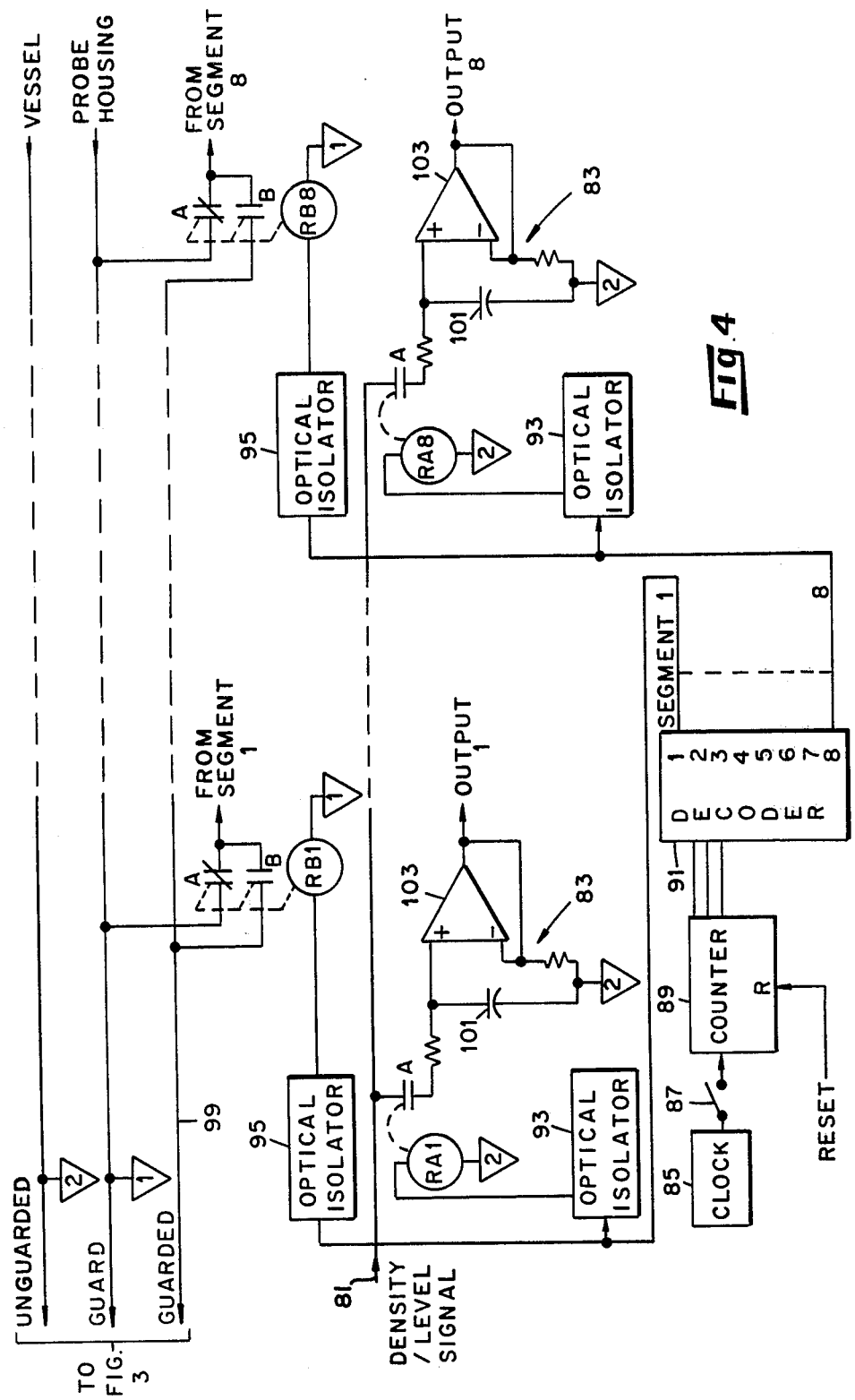
FIG. 4 is a schematic circuit diagram of the segment selection circuit and control and eight-channel sampling and hold circuit shown in block form in FIG. 1.

Referring now to FIG. 4, there is shown the segment selection circuitry 31 at the top of FIG. 4, which includes the relays RB1-RB8 and their associated contacts, and the control and eight-channel sample and hold circuitry is shown in the lower half of FIG. 4. The serial density/level signal from the output of amplifier 71 (FIG. 3) is applied to line 81 which is connected through normally open relay contacts to sample and hold circuits 83. Although only the first and last sample and hold circuits are shown, it will be understood from the drawing that there are eight channels and thus eight sample and hold circuits corresponding to the eight segments of the capacitance probe. The sampling rate of the probe segments is controlled by a variable frequency oscillator or clock 85. The output of the clock 85 is connected through an on-off switch 87 to the count input of a counter 89. Counter 89 is a binary-codeddecimal counter which is wired to reset at the end of seven clock pulse counts so that there are eight binary codes available on the three lines connected between the output of the counter and a decoder 91. The decoder 91 decodes the counter output and activates the output lines 1-8 in sequence as the clock pulse count is accumulated in the counter 89. The corresponding channel segment output from the decoder 91 is connected through optical isolators 93 and 95, respectively, to corresponding channel relays RA and RB. The optical isolators 93 and 95 in each of the channels provide the necessary decoupling of the circuitry that operates at two different common levels (common-1 and common-2). These are commercially available components which isolate the input from the output through the use of a light beam from a light-emitting diode activated by the input and a light detecting circuit in the output which switches the output signal on.

When the particular channel is selected by the decoder 91, the corresponding signal output line from the decoder 91 is activated operating the corresponding channel relays RA and RB. Relay RA connects the density/level line 81 to the input of the sample and hold circuit 83 for the selected channel. Relays RB, have one set of normally closed contacts which connect the corresponding channel segment of the probe to the common-1 line or the guard electrode of the probe. Relays RB have a second set of normally open contacts B which close when the relay RB is activated connecting the corresponding channel segment of the probe to the common guarded input line 99 which is connected to the segment input signal terminal 99 of FIG. 3. Thus, as each segment is scanned, the corresponding sample and hold channel is activated and the segment is released from common-1 and connected to the input of the detection circuit. Filter and hold capacitors 101 in each of the sample and hold circuits 83 store the signals from the respective segments as transmitted through contacts of relays RA1 to RA8. Amplifiers 103 in the sample and hold circuits 83 provide a high input resistance buffer for the hold capacitors 101 and low impedance parallel outputs for computer or direct panel display use.

The switch 87 in the output line of the clock 85 is provided so that the clock may be disconnected from the counter to allow continuous observation of any selected segment.

The clock output and channel 1 address output may be provided for synchronizing a strip chart recorder or computer input. A computer input may be provided to the counter so that a computer can be used to advance the address counter 89. A manual reset is provided to the input of counter 89 to permit resetting of the counter to address 1 (channel 1) at any time by an operator.

Figure 5:
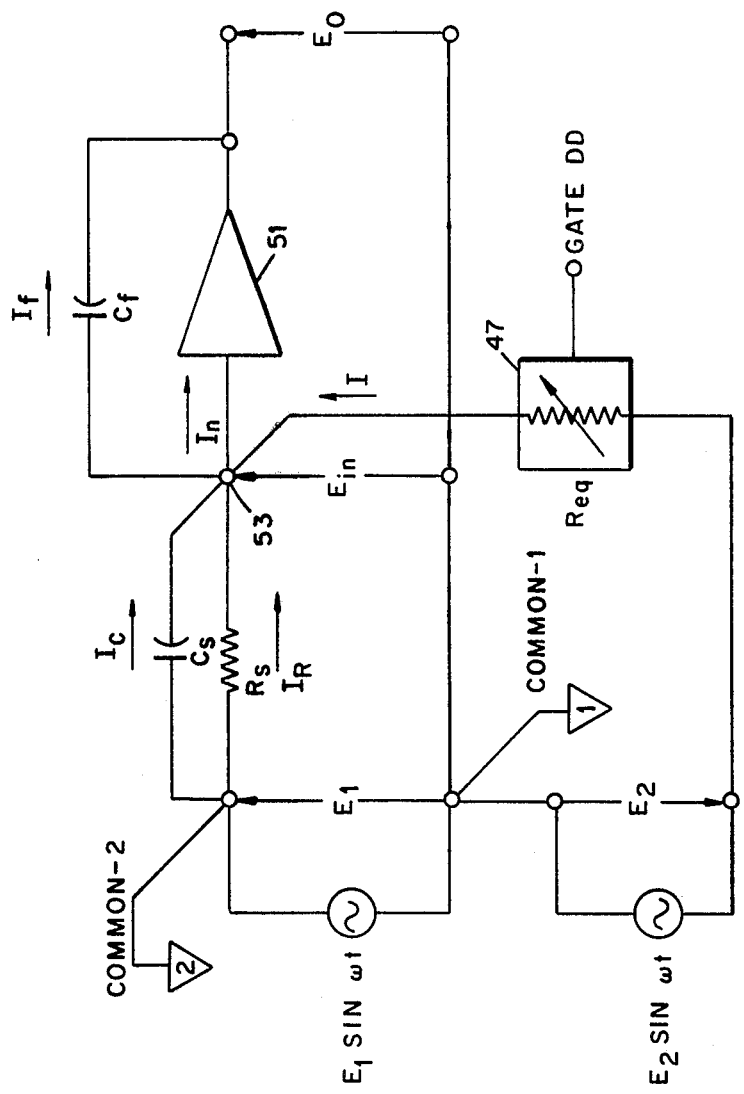
FIG. 5 is a simplified diagram illustrating the basic operation of the capacitance detection circuit of FIG. 3.

Referring now to FIG. 5, there is shown an overly simplified schematic form of the instrument circuit or detection circuit of FIG. 3. The central element in this system is the detector operational amplifier 51, a linear summer that combines input current $I_C$, $I_R$ and I with feedback current, $I_F$ at the input node 53. The capacitance $C_S$ and the resistance $R_S$ represent the selected segment capacitance and resistance, respectively. During normal operation, I is controlled automatically to maintain I approximately equal to $I_R$, and, if $I_{in}$ is made negligible and the amplifier gain (A) is sufficiently large, $$E_0 \simeq -E_1(C_s/C_f). \tag{1}$$

Equation 1 states that the output voltage $E_0$ is proportional to segment effective capacitance, providing the input voltage $E_1$ and feedback capacitance $C_f$ are fixed.

To accomplish resistive component correction at the summer input 53, the output voltage $E_0$ is sampled synchronously with the proper phase relative to the input voltage $E_1$ is derive the control voltage (DD) proportional to the net segment resistive component. The control voltage DD is applied to the modulator amplifier 47. The connections are arranged such that an increase in the segment conductive component, which is independently detected and amplified, produces an increase in current I at the summing junction 53, thus, tending to diminish the initial change in $I_R$. At best, this circuit only limits the resistive component of the output voltage $E_0$ to a level that does not severely reduce the amplifier dynamic range available for the capacitive voltage component. However, the presence of a smaller voltage component due to segment resistive current component in the output signal $E_0$ is rendered inconsequential by the use of the synchronous detector phased to sense only the capacitive component of the output voltage. This is the synchronous detector 65 shown in FIG. 3.

The output voltage $E_0$ can then be expressed by the following relationship:

$$E_0 = [E_1/R_sC_f - E_2/R_{eq}C_f] \int \sin wt \, dt - [E_1C_s/C_f]\sin wt. \tag{2}$$

The validity of equation 2 requires that the amplifier gain be made sufficiently large and also that the amplifier input impedance be high enough to avoid appreciable input current $I_{in}$.

It is evident in equation 2 that if $R_{eq}$ is suitably varied, the first term in this equation can be reduced to near 0. To determine how $R_{eq}$ must vary, this member is set equal to 0 and $$R_{eq} = (E_1/E_2)R_s \tag{3}$$

results. This indicates that $R_{eq}$ must vary with $R_s$ multiplied by some fixed constant $E_1/E_2$, the ratio of magnitudes of direct and inverted excitation voltages. To accomplish this the modulator amplifier varies current I such that $R_{eq} = E_2/I$ satisfies equation (3) by means of feedback control to its gate DD.

The permittivity measurements which correspond to the density of the medium between the segment of the probe and the vessel wall, may be used in various ways as indicated above to determine either the level of the medium being monitored or its average density characteristics, at a slow scanning rate, or its dynamic characteristics, at a high scanning rate. The level indication of the fluidized bed, for example, may be determined by positioning the probe so at least one segment will always be above the level to be measured and the sharp change in permittivity reading will indicate the fluid bed level.

The foregoing description of a preferred embodiment of the invention has been presented for purposes of illustration and description. It is not intended to be exhaustive or to limit the invention to be precise form disclosed, and obviously many modifications and variations are possible in light of the above teaching. For example, the capacitance probe arrangement may be varied to include any plurality of segments to provide for level measurements or density profiles of different mediums including three dimensional. Obviously this would require the addition of the corresponding number of channels in the control and channel sample and hold circuits. The embodiment was chosen and described in order to best explain the principals of the invention and its practical application to thereby enable others skilled in the art to be able to utilize the invention is various embodiments and with various modifications as are suited to the particular use contemplated. It is intended that the scope of the invention be defined by the claims appended hereto.

What is claimed is:

1. A capacitance based density/level monitor for a fluid-like medium within an electrically conductive containment vessel comprising:
a capacitance probe adapted to be vertically disposed in said medium and including an electrically conductive housing, a plurality of electrically conductive segments disppposed vertically of said housing, each of said segments separately insulated from said housing;
means for applying a predetermined frequency excitation voltage between said containment vessel and said probe housing, thereby generating a current through said medium;
a capacitance detection circuit means for separately detecting the quadrature component of said current flowing through said medium in the presence of a resistive current component which is in phase with said excitation voltage and generating a voltage at an output thereof indicative of the selected probe segment-to-vessel wall capacitance, including an operational amplifier having an inverting input forming a current summing junction for receiving said selected probe segment current and a feedback current, means for applying said selected probe segment current to said current summing junction, synchronous detection circuit means operable in response to said excitation voltage for separately synchronously detecting the capacitive and resistive voltage components of the voltage signal at the output of said operational amplifier corresponding to the capacitive and resistive components of said selected probe segment current and generating voltages at separate outputs thereof corresponding to said capacitive and resistive component voltages respectively, a gate-controlled amplifier means for generating said feedback current at an output thereof coupled to said current summing junction of said operational amplifier and further including a gate control input connected to said resistive component voltage output of said synchronous detection circuit means for varying the gain of said amplifier in response to the amplitude of said resistive component voltage and a phase-adjusting circuit means responsive to said excitation voltage for generating a selected phase voltage input to said gate-controlled amplifier to provide the proper phase for said feedback current to cancel the resistive component current of said selected probe segment current applied to said summing junction;
segment selection circuit means responsive to a control signal for separately connecting each of said plurality of segments of said probe in a selected sequential order to the input of said capacitance detection circuit means;
sampling circuit means having a plurality of sampling channels corresponding to said plurality of probe segments for sampling the output voltage from said detection circuit means from corresponding ones of said plurality of probe segments in response to said control signal; and
control circuit means for generating and applying said control signal to control inputs of said segment selection circuit means and said sampling circuit means to select and sample the corresponding segment detected capacitance signal at a preselected sampling rate.

2. The monitor as set forth in claim 1 wherein said capacitance probe includes a cylindrical electrically conductive tube forming said housing, a plurality of axially aligned conductive segments disposed in a corresponding plurality of openings in the wall of said tube with the outer surfaces of said segments flush with the outer surface of said tube, and an electrically insulating material disposed between said tube and each of said segments and further including a plurality of electrical conductors connected between corresponding ones of said plurality of segments and extending through the interior of said tube to corresponding inputs of said segment selection circuit means.

3. The monitor as set forth in claim 1 wherein said synchronous detection circuit means includes a first synchronous detection channel including a first delay circuit means responsive to said excitation voltage for generating a synch pulse at an output thereof delayed $\frac{1}{4}$ of a period of the excitation voltage signal and a first synchronous detector responsive to said synch pulse and the output voltage of said operational amplifier for generating an output signal proportional to the capacitive voltage component of the output voltage of said operational amplifier and a second synchronous detection channel including a second delay circuit means responsive to said excitation voltage for generating a synch pulse at an output thereof delayed $\frac{1}{2}$ of a period of the excitation voltage signal and a second synchronous detector responsive to said synch pulse and the output voltage of said operational amplifier for generating a voltage proportional to the resistive voltage component of the output voltage of said operational amplifier and an inverting voltage amplifier connected between the output of said second synchronous detector and the gate-control input of said gate-controlled amplifier.

4. The monitor as set forth in claim 3 wherein said fluid-like medium contained within an electrically conductive vessel is a fluidized bed of granular coal contained in a fluidized bed combustor.

5. The monitor as set forth in claim 4 wherein said electrically conductive tube and each of said plurality of conductive segments of said probe are formed of stainless steel and said electrically insulating material is formed of heat resistant ceramic material.

* * * * *